United States Patent
Li et al.

(10) Patent No.: US 8,959,651 B2
(45) Date of Patent: Feb. 17, 2015

(54) PROTECTING PRIVACY DATA IN MAPREDUCE SYSTEM

(71) Applicant: International Business Machines Corporation, Armonk, NY (US)

(72) Inventors: Li Li, Beijing (CN); Chi Liu, Beijing (CN); Ju Wei Shi, Beijing (CN); Wenjie Wang, Shanghai (CN); Qi Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 13/868,218

(22) Filed: Apr. 23, 2013

(65) Prior Publication Data
US 2013/0291118 A1   Oct. 31, 2013

(30) Foreign Application Priority Data
Apr. 28, 2012   (CN) .......................... 2012 1 0133550

(51) Int. Cl.
*G06F 7/04* (2006.01)
*G06F 21/60* (2013.01)
*G06F 21/62* (2013.01)

(52) U.S. Cl.
CPC ............ *G06F 21/60* (2013.01); *G06F 21/6245* (2013.01)
USPC .......................................................... 726/26

(58) Field of Classification Search
USPC .......................................................... 726/26
See application file for complete search history.

(56) References Cited

U.S. PATENT DOCUMENTS

| 7,966,340 B2 | 6/2011 | Friedman et al. | |
| 8,397,293 B2 * | 3/2013 | Aupperle et al. | ............... 726/22 |

(Continued)

FOREIGN PATENT DOCUMENTS

WO   2007037764 A1   4/2007

OTHER PUBLICATIONS

George Kovoor, "MR-J: A MapReduce Framework for Multi-core Architectures," A dissertation submitted to the University of Manchester for Degree of Master of Science in the Faculty of Engineering and Physical Sciences, 2009, pp. 1-125.

(Continued)

*Primary Examiner* — Teshome Hailu
(74) *Attorney, Agent, or Firm* — Cantor Colburn LLP

(57) ABSTRACT

A method for protecting privacy data in a MapReduce system comprising a private subsystem and a public subsystem includes receiving a MapReduce program to be executed in the MapReduce system, wherein the MapReduce program contains instructions that designate the privacy property of the input and output data of a Map function and the output data of a Reduce function; detecting the privacy property of the input and output data of the Map function and the output data of the Reduce function prior to execution of the MapReduce program; and assigning the data for processing by the private subsystem and the public subsystem based on the detected privacy property, wherein the data of which the privacy property is private are assigned to the private subsystem.

14 Claims, 10 Drawing Sheets

(56) References Cited

U.S. PATENT DOCUMENTS

| | | |
|---|---|---|
| 8,544,094 B2 * | 9/2013 | Aupperle et al. ............... 726/23 |
| 2009/0112784 A1 | 4/2009 | Brun et al. |
| 2011/0055559 A1 * | 3/2011 | Li et al. .......................... 713/165 |
| 2011/0154341 A1 | 6/2011 | Pueyo et al. |
| 2011/0162069 A1 * | 6/2011 | Aupperle et al. ............... 726/22 |
| 2011/0276789 A1 | 11/2011 | Chambers et al. |
| 2012/0159627 A1 * | 6/2012 | Aupperle et al. ............... 726/23 |
| 2014/0101714 A1 * | 4/2014 | Kundu et al. .................... 726/1 |

OTHER PUBLICATIONS

Indranil Palit, et al.,"Scalable and Parallel Boosting with MapReduce," IEEE Transactions on Knowledge and Data Engineering, vol. 24, Issue, 10, pp. 1-14, Oct. 2012.

Erik-Oliver Blass, et al., "PRISM—Privacy-Preserving Search in MapReduce," PETS'12, Proceedings of the 12th International Conference on Privacy Enhancing Technologies, 2012, pp. 1-14.

T. Trieu, "Intermediate Data Management for Map/Reduce Applications," Master Thesis, Jun. 4, 2010, pp. 1-37.

* cited by examiner

PROTECTING PRIVACY DATA IN MAPREDUCE SYSTEM

PRIORITY

This application claims priority to Chinese Patent Application No. 201210133550.1, filed Apr. 28, 2012, and all the benefits accruing therefrom under 35 U.S.C. §119, the contents of which in its entirety are herein incorporated by reference.

BACKGROUND

The present invention relates generally to data processing techniques in programming systems having large-scale data sets and, in particular, to protection of privacy data in MapReduce systems.

MapReduce is a software architecture proposed by Google Corporation. The MapReduce architecture is employed for parallel computation on large-scale data set (bigger than 1TB), in which the parallel computation is achieved by distributing a large scale of operations on the data set to individual nodes on the network. It has wide range of applications fields like Web access log analysis, document clustering, machine learning, data statistics, statistics-based machine translation, etc. For example, Hadoop is an embodiment of MapReduce implementation. More and more cloud services providers have deployed the MapReduce framework in their cloud computing systems.

For users that adopt the MapReduce computation provided by cloud computing services, computing nodes of the cloud computing system are in the public domain. In the MapReduce computation process, privacy data of the users are also exposed to the public domain and can hardly be effectively protected. Therefore, many users would like to put the privacy data involved in MapReduce computation processes into private domain for processing, for example, into the private cloud system of the enterprise for processing.

SUMMARY

According to one aspect of the invention, there is provided a method for protecting privacy data in a MapReduce system comprising a private subsystem and a public subsystem, the method comprising: receiving a MapReduce program to be executed in the MapReduce system, wherein the MapReduce program contains instructions for designating the privacy property of the input and output data of a Map function and the output data of a Reduce function; detecting the privacy property of the input and output data of the Map function and the output data of the Reduce function prior to execution of the MapReduce program; and assigning the data for processing by the private subsystem and the public subsystem based on the detected privacy property, wherein the data of which the privacy property is private are assigned to the private subsystem.

According to another aspect of the present invention, there is provided an apparatus for protecting privacy data in a MapReduce system comprising a private subsystem and a public subsystem, the apparatus comprising: a program receiving device, configured to receive a MapReduce program to be executed in the MapReduce system, wherein the MapReduce program contains instructions that designate the privacy property of the input and output data of a Map function and the output data of a Reduce function; a static detection device, configured to detect the privacy property of the input and output data of the Map function and the output data of the Reduce function prior to execution of the MapReduce program; and a static data allocation device, configured to assign the data for processing by the private subsystem and the public subsystem based on the detected privacy property, wherein the data of which the privacy property is private are assigned to the private subsystem.

BRIEF DESCRIPTION OF THE SEVERAL VIEWS OF THE DRAWINGS

The above and other objectives, features and advantages will become more apparent from the description of exemplary embodiments of the present disclosure given in more detail in conjunction with the drawings, wherein, in the exemplary embodiments of the present disclosure, the same reference numerals typically represent the same components.

DETAILED DESCRIPTION

Figure 1:
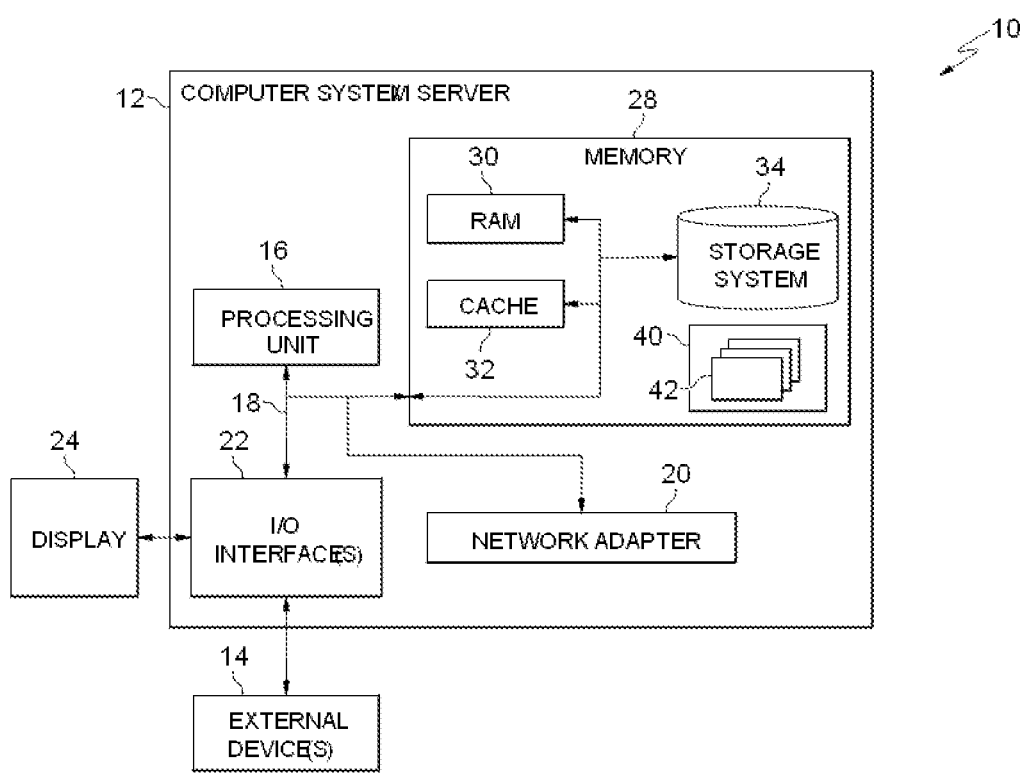
FIG. 1 depicts a cloud computing node according to an embodiment of the present invention.

Exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
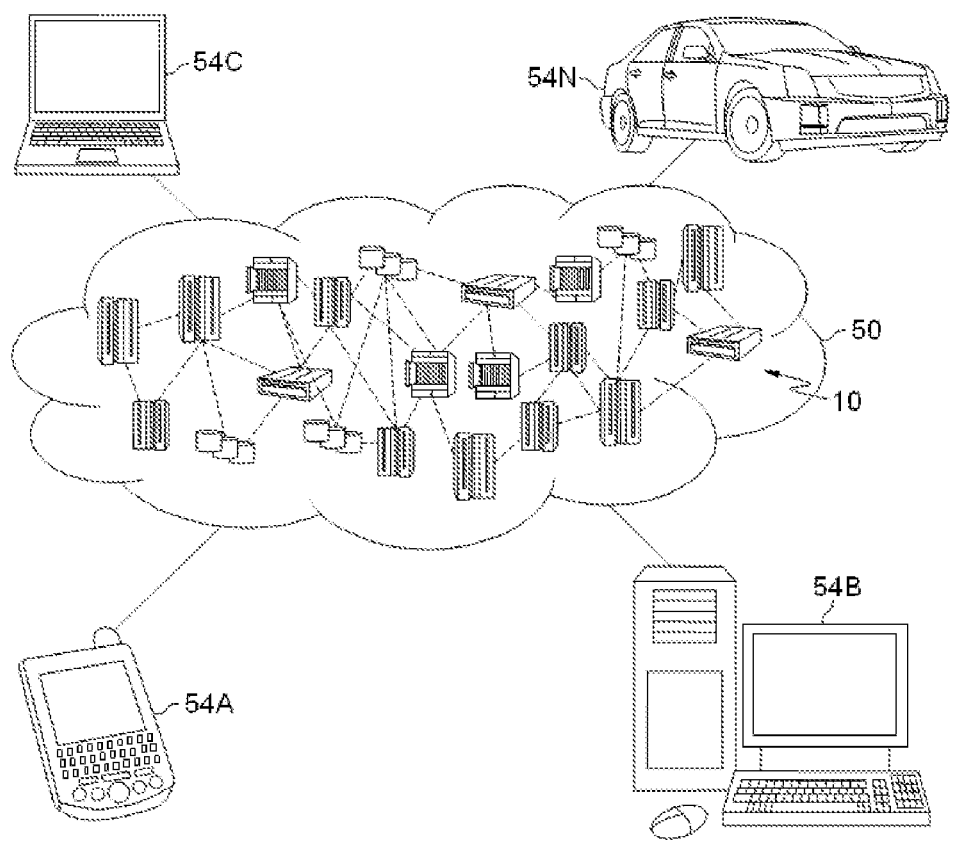
FIG. 2 depicts a cloud computing environment according to an embodiment of the present invention.
Figure 3:
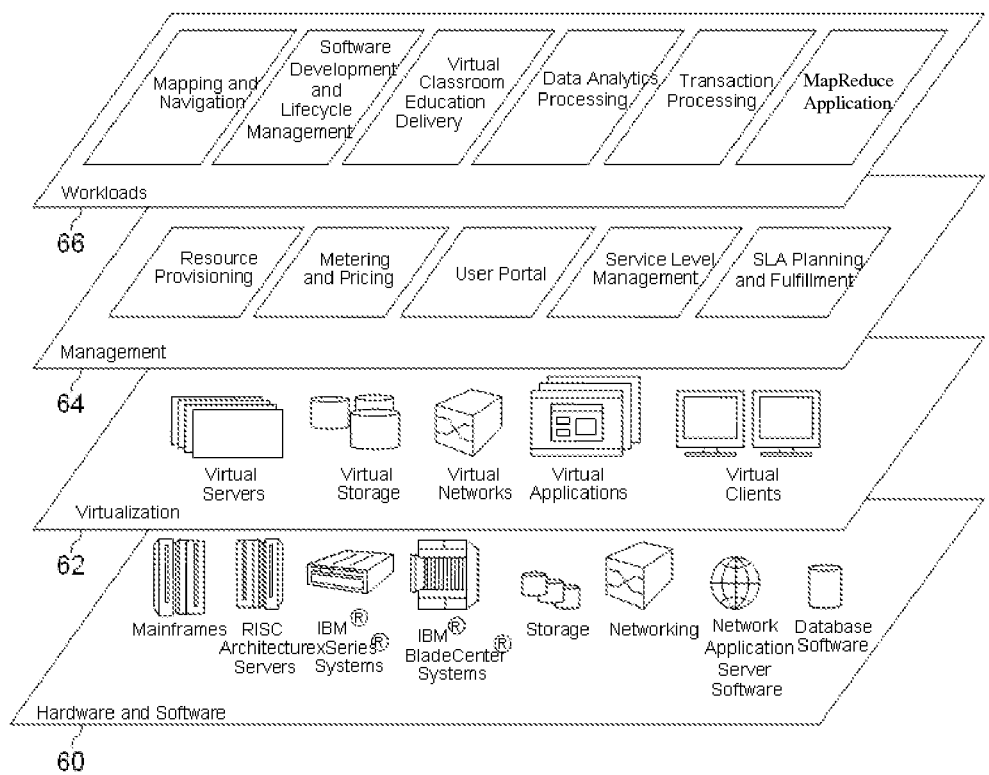
FIG. 3 depicts abstraction model layers according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Referring now to FIG. 2, a set of functional abstraction layers provided by cloud computing environment 50 (FIG. 2) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; MapReduce applications; and so on.

Figure 4:
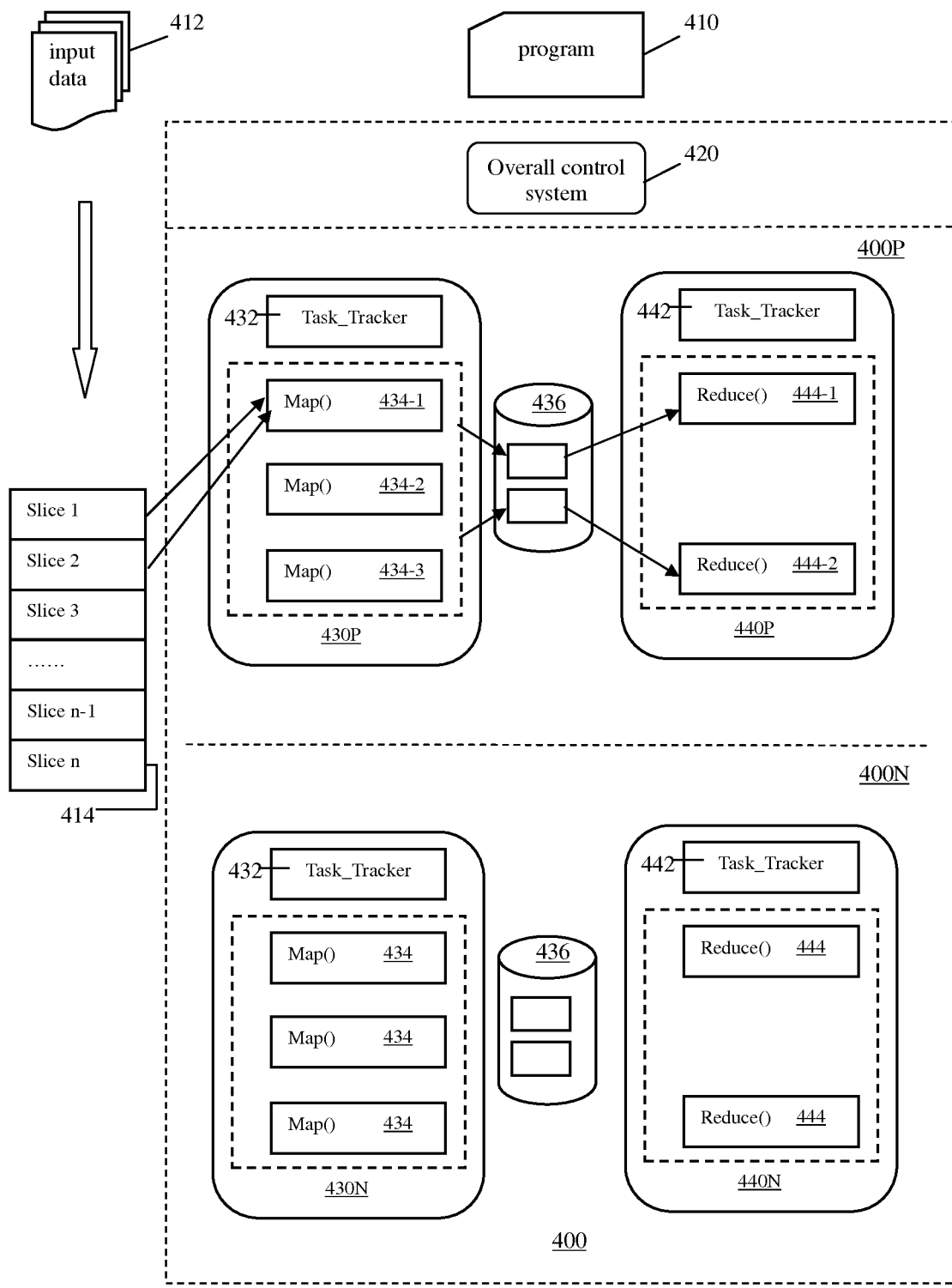
FIG. 4 schematically depicts a block diagram of a MapReduce system in which various embodiments of the invention may be implemented.

Referring now to the drawings, various embodiments of the present invention will be described. Referring first to FIG. 4, a MapReduce system 400 in which various embodiments of the invention may be implemented will be described.

Those skilled in the art shall appreciate that the implementation software of the MapReduce model is to specify a set of Map functions(Map( )) to map a set of key-value pairs into a new set of key-value pairs and specify concurrent Reduce function(Reduct( ) to ensure that each of all of the mapped key-value pairs will share the same set of keys. The Map function is a specified operation performed on each element of a list conceptually composed of some independent elements, and the Reduce function is the operation of appropriately merging on the elements of a list. In short, the Map function breaks down an input dataset into intermediate key/value pairs which is taken as the output and denoted as Emit (K,V). The Reduce function synthesizes the key/value pairs output by the Map function and finally outputs the result of the synthesis, which is denoted as Output (K,V). These two functions are provided in MapReduce programs by the programmer.

Tuning to FIG. 4, as shown in the figure, the system 400 comprises multiple computing nodes 430P, 430N, 440P and 440N.

The computing nodes 430P, 430N, 440P and 440N may be implemented with the computer system/server 12 as shown in FIG. 1, and included in the cloud computing node shown in FIG. 1, wherein computing nodes 430P and 430N are allocated for the execution of Map tasks. A computing node used to execute Map tasks is also referred to as "Map task node". The computing nodes 440P and 440N are allocated for the execution of Reduce tasks. A computing node used to execute Reduce tasks is also referred to as "Reduce task node".

At run time, the overall control system 420 receives jobs submitted by the user program 410. Each job consists of a set of Map and Reduce tasks (not shown) and the input dataset 412.

The overall control system 420 splits the input dataset 412 into smaller slices 414, or "data fragments" (e.g., slice 1, slice 2, ..., slice n). These slices will be assigned or allocated to the Map task node 430P and 430N.

The execution of the job is divided into two stages: the Map phase and the Reduce phase.

In the Map phase, the Map task node 430P performs the computation specified in the user program 410. The Map task node 430P may employ multiple processes 434 (434_1, 434_2, 434_3) to perform the Map computation in parallel, and use a task tracker 432 to manage these processes.

The Map tasks node 430P will store the output data of the Map computation in the local storage 436 as intermediate results.

When All Map tasks are completed, the intermediate results are divided and assigned to the Reduce task node 440P as the input data of Reduce tasks respectively.

In the Reduce phase, the Reduce task node 440P performs Reduce computation as specified in the user program 410. The Reduce task node 440P 444 (for example, 444_1, 444_2) may use multiple processes to perform the Reduce computation in parallel, and use a task tracker 442 to manage the processes.

The output of the Reduce task node 440P may be stored into the file system (not shown) as the final result, or used for further Reduce computation to achieve the final result.

The Map task node 430N and the Reduce task node 440N are respectively similar to the Map task node 430P and the Reduce task node 440P both in the structure and the function. The execution on the Map task node 430N and the Reduce task node 440N in the Map phase and the Reduce phase are also similar with the Map task node 430P and the Reduce task nodes 440P. There may be more such Map task nodes and Reduce task nodes.

Existing MapReduce systems in the prior art, when running MapReduce applications, do not consider whether the protected data of users shall be exposed in computing nodes of the public domain.

The present invention embodiments may be implemented in the MapReduce system 400. Unlike the prior art, the MapReduce system 400 is further divided into a public subsystem and a private subsystem. As shown in FIG. 4, the system 400 comprises a public subsystem 400P and a private subsystem 400N, wherein the public subsystem 400P contains one or more Map task nodes 430P and one or more Reduce task nodes 440P and the private subsystem 400N contains one or more Map task nodes 430N and one or more Reduce task nodes 440N. The private subsystem 400N is, for example, a computing system within the enterprise or a private cloud system which is communicatively coupled to another subsystem of the MapReduce system 400 via a network (not shown). The data processed and stored on the private subsystem 400P will not be exposed to the public domain.

An overall concept of the invention embodiments is that by extending existing primitives in the MapReduce programming code, static and/or dynamic detection may be conducted on whether the data to be processed by a MapReduce program belong to protected data, and the protected data are assigned to a private subsystem for processing.

Figure 5:
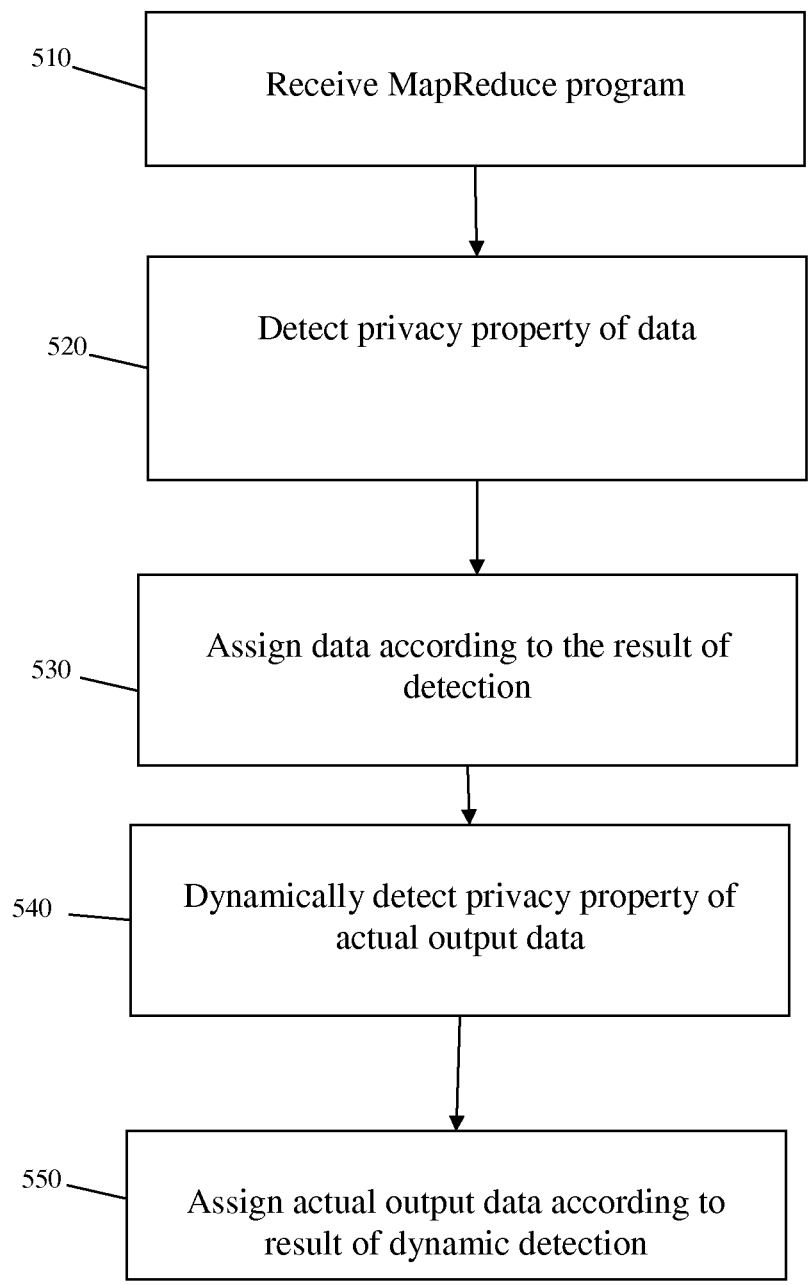
FIG. 5 schematically shows a flowchart of the method according to an embodiment of the present invention.

Referring now to the drawings, a description of the various embodiments according to the disclosure is provided. FIG. 5 schematically illustrated a flowchart of the method according to an embodiment of the present invention. More specifically, FIG. 5 is a flowchart of a method for protecting privacy data in a MapReduce system in accordance with an embodiment of the present invention, wherein the MapReduce system comprises a public subsystem 400P and a private subsystem 400N.

In block 510, a MapReduce program to be executed in the MapReduce system is received, wherein the MapReduce program contains instructions that designate the privacy property the input and output data of a Map function and the output data of a Reduce function.

Block 510 is illustrated below by way of example.

EXAMPLE 1

The Mapreduce Program 410 Is Program 1, The Input Dataset 412 In Shown In Table 1.

Program 1: (function: calculate the number of personnel with salary greater than 6000 (inclusive))

```
MapInputSplit:
    For each input line
        EmitN(input line)
Map:
    For each input line;
        If (salary> = 6000)
            Then EmitN ("number", "1");
Reduce:
    For each {"number", List {"1"}};
        OutputN ("number", SUM).
```

TABLE 1

| Name | Gender | Age | Salary | Phone |
|------|--------|-----|--------|-------|
| Alpha | M | 25 | 3000 | 1381110001 |
| Bettie | M | 26 | 4000 | 1381110002 |
| Cynsia | F | 24 | 6000 | 1381110003 |
| Doukun | M | 21 | 2000 | 1381110004 |
| Eckla | M | 30 | 7000 | 1381110005 |
| Feemie | F | 31 | 8000 | 1381110006 |

Those skilled in the art shall appreciate that the data shown in Table 1 have been simplified. In practical applications, the data to be processed by the MapReduce program is massive, and the data for processing may be either structured data or unstructured data.

Program 1 consists of three segments: segment "MapInputSplit denotes inputting source data for the Map phase; segment "Map" denotes a Map function, and segment "Reduce", denotes a Reduce function.

Program 1 contains instructions that designate the privacy property of the input and output data of the Map function and the output data of the Reduce function, i.e., instructions EmitN(input line), "EmitN(number,"1")" and "OutputN(number, SUM)".

The instruction "EmitN( )" is an extension of the output instruction or primitive "Emit( )" in the MapReduce programming code, and the instruction OutputN( )MapReduce is an extension of the output instruction or primitive Output( ) in the MapReduce programming code. The symbol "N" in the "EmitN( )" and the "OutputN( )" means that the privacy property of relevant output data is "private" (Non-public).

For example, in Program 1, the instruction "EmitN (input line)" indicates that the privacy property of the output data of the "MapInputSplit" is "private", i.e., the privacy property of the input data of the Map function is "private". The instruction "EmitN(number, "1")" indicates that the privacy property of the output data of the corresponding Map function is "private". The instruction "OutputN(number, SUM)" indicates that the privacy property of the output data of the corresponding Map function is "non-private".

In the context of this disclosure, data of which the privacy property is "private" means the data that may not be exposed to the public domain, also referred to as "privacy data", "private data" or "secret data". Data of which the privacy property is "non-private" means the data that may be exposed to the public domain, also referred to as "non-privacy data", "public data", "non-private data".

It may be seen from more examples hereinafter that the extended instruction "EmitP( )" and "OutputP( )" may also be used to indicate that the privacy property relevant output data is "public". Of course, it may be provided that, if it has been defined that "EmitN( )" and "OutputN( )" indicate that privacy property of relevant output data is "private", then "Emit( )" and "Output( )" are respectively equivalent to "EmitP( )" and "OutputP( )", and vice versa.

Proceeding to block 520 of FIG. 5, before the MapReduce program is executed, detection of the privacy property of the input and output data of the Map function and the output data of the Reduce function is made. According to an embodiment of the invention, the detection may be made while the MapReduce program is compiled.

According to an embodiment of the invention, the detection of the privacy property of the input and output data of the Map function and the output data of the Reduce function comprises:

Detecting privacy data from the input and output data of the Map function and the output data of the Reduce function by analyzing instructions in the MapReduce program that designate the privacy property of the input and output data of the Map function and the output data of the Reduce function.

For example, while the source code of Program 1 is compiled, Program 1 is analyzed. According to the instructions "EmitN(input line)", "EmitN(number, "1") and "OutputN (number, SUM), privacy data may be detected from the input and output data of the Map function and the output data of the Reduce function.

Specifically, the instruction "EmitN (input line)" indicates that privacy property of the output data of "MapInputSplit" is "private". And the output data of "MapInputSplit" is the input data the Map function, therefore, the privacy property of the Map function input data is "private", The detection result may be denoted as Mi=N, wherein, "Mi" represents the input data of the Map function and "N" represents private.

From the instruction "EmitN (number, "1")" it may be detected that the privacy property of the output data of the Map function is "private", which is denoted as Mo=N, wherein the symbol "Mo" represents the output data of the Map function.

The output data of the Map function is the input data of the Reduce function. Therefore, the privacy property of the input data of the Reduce function is "private", which is denoted as Ri=N, wherein "Ri" represents the input data of the Reduce function.

From "OutputN(number, SUM) it may be detected that the privacy property of the Reduce function is "private", which is denoted as Ro=N, wherein "Ro" represents the output data of the Reduce function.

The above detection result may be expressed as: {Mi, Mo, Ri, Ro}=(N, N, N, N).

It may be calculated that number of combinations of such detection results is up to 24=32.

Hereinafter, to facilitate the description and where the context is clear, the symbol "N" is used in the specification to represent data privacy property of "private", and the symbol "P" is used to indicate data privacy property of "non-private".

At block 530, detected private data is assigned to the private subsystem 400N for processing. An implementation of Block 530 will be described below in more detail by way of example.

In the case of Example 1, {Mi, Mo, Ri, Ro,}=(N, N, N, N).

Figure 6:
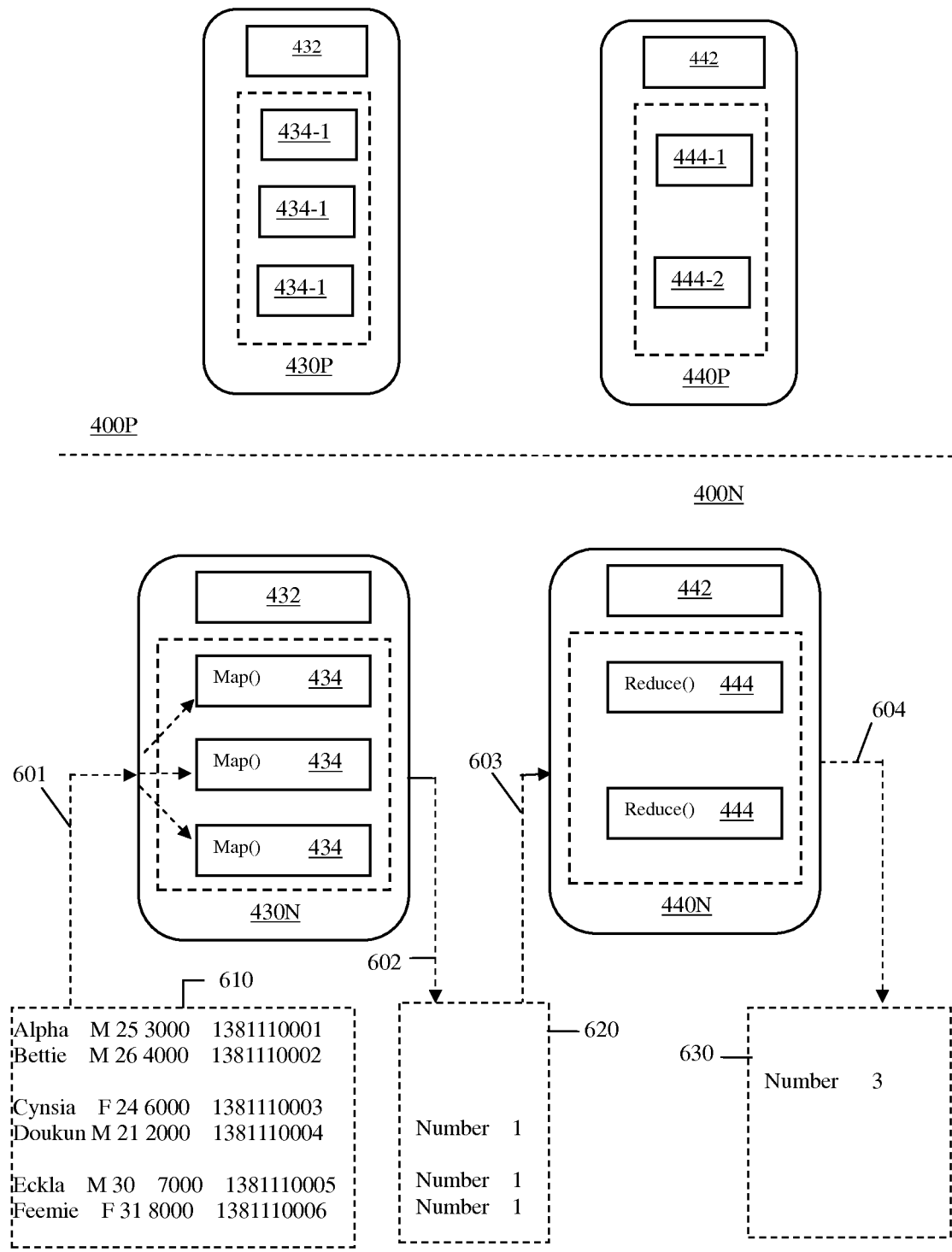
FIGS. 6-8 schematically shows processes of the method of making static detection and data allocation according to various embodiments of the invention.

FIG. 6 schematically shows assigning data for the subsystem of the MapReduce system according to an embodiment of the invention. The associated MapReduce program is Program 1 as shown above.

Except for some of the details, the MapReduce system shown in FIG. 6 is substantially the same in structure with the system 400 of FIG. 4.

The source data 412 shown in Table 1 is first divided into three data fragments denoted by reference number 610.

As shown by dashed arrow 601, since Mi=N, the data fragments 610 are assigned to Map task node 430N of the private subsystem 400N. The data fragment 610 is further assigned to different virtual machines or processes 434 by the task tracker 432 of the Map task node 430N for the computation of the Map function. As shown by dashed arrow 602, output data 620 of the Map function is generated at the Map task node 430N.

As shown by dashed arrow 603, since Ri=N, the output data 620 of the Map function is assigned to the Reduce task node 440N of the private subsystem 400N. The input data 620 is further assigned to different virtual machines or processes 444, by the task tracker 442 of the Reduce task node 440N, for the computation of the Reduce function.

As shown by dashed arrow 604, output data 630 of the Reduce function is generated at the Reduce task node 440N.

According to an embodiment of the invention, one of the strategies adopted in assigning data for processing to the public subsystem and the private subsystem is to assign private data only to the private subsystem, whereas non-private data is assigned the public subsystem. In cloud computing services, the use of this strategy is to leverage computing resources of the public domain to the largest possible extent.

The following example illustrates the implementation of this embodiment.

EXAMPLE 2

The MapReduce Program 410 Is Program 2, The Input Dataset 412 Is The Data Of Columns 1 To 2 Of Table 1.

Program 2: (function: calculate the number of males and the number of females)

```
MapInputSplit:
    For each input line
        EmitP(input line)
Map:
    For each input line;
        EmitP(gender, "1");
Reduce:
    For each {gender, list {"1"}};
    OutputP(gender, SUM).
```

Figure 7:
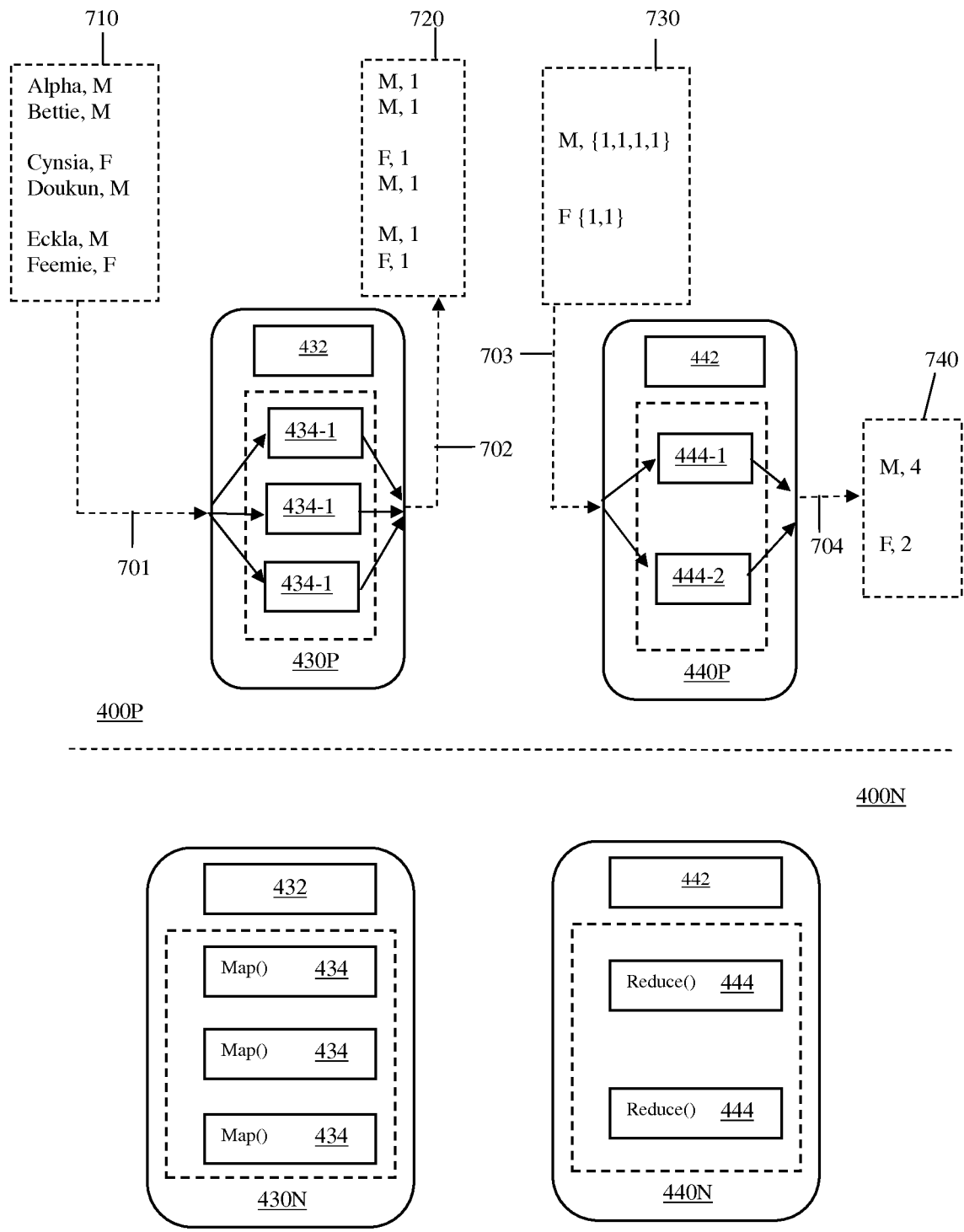

FIG. 7, which is in connection with Program 2, schematically shows the allocation of data for the subsystem of the MapReduce system according to an embodiment of the invention. The MapReduce system 400 as shown in the figure is the same as the system 400 of FIG. 6.

At first, based on the instructions EmitP(input line), EmitP("gender", "1") and OutputP("gender", SUM) in Program 2 that designate the privacy property of the input and output data of the Map function and the output data of the Reduce function, it is detected that the input and output data of the Map function and the input and output data of the Reduce function are all non-private data, i.e., {Mi, Mo, Ri, Ro,}=(P, P, P, P).

The source data 412 is first divided into three data fragments 710.

The data allocation process is carried out based on the above detection as follows.

As shown by dashed arrow 701, since Mi=P, the three data fragments 710 of the source data are assigned to the Map tasks node 430P of the public subsystem 400P. The data fragments 710 are further assigned to different virtual machines or processes 434-1,434-2,434-3, by the task tracker 432 of the Map task node 430P, for the computation of the Map function.

As shown by dashed arrow 702, output data 720 of the Map function is generated at the Map task node 430P.

The Map function's output data 720 is reduced to input data 730 for the Reduce function. As shown by dashed arrow 703, since Ri=P, the input data 730 for the Reduce function is assigned to the Reduce task node 440P of the public subsystem 400P. The input data 730 is further assigned to different virtual machines or processes 444-1,444-2, by the task tracker 442 of the Reduce task node 440P, for the computation of the Reduce function.

As shown by dashed arrow 704, output data 740 of the Reduce function is generated at the Reduce task node 440P. The computation result represented by the output data 740 is: the number of males ("M")=4, the number of females ("F")=2.

Figure 8:
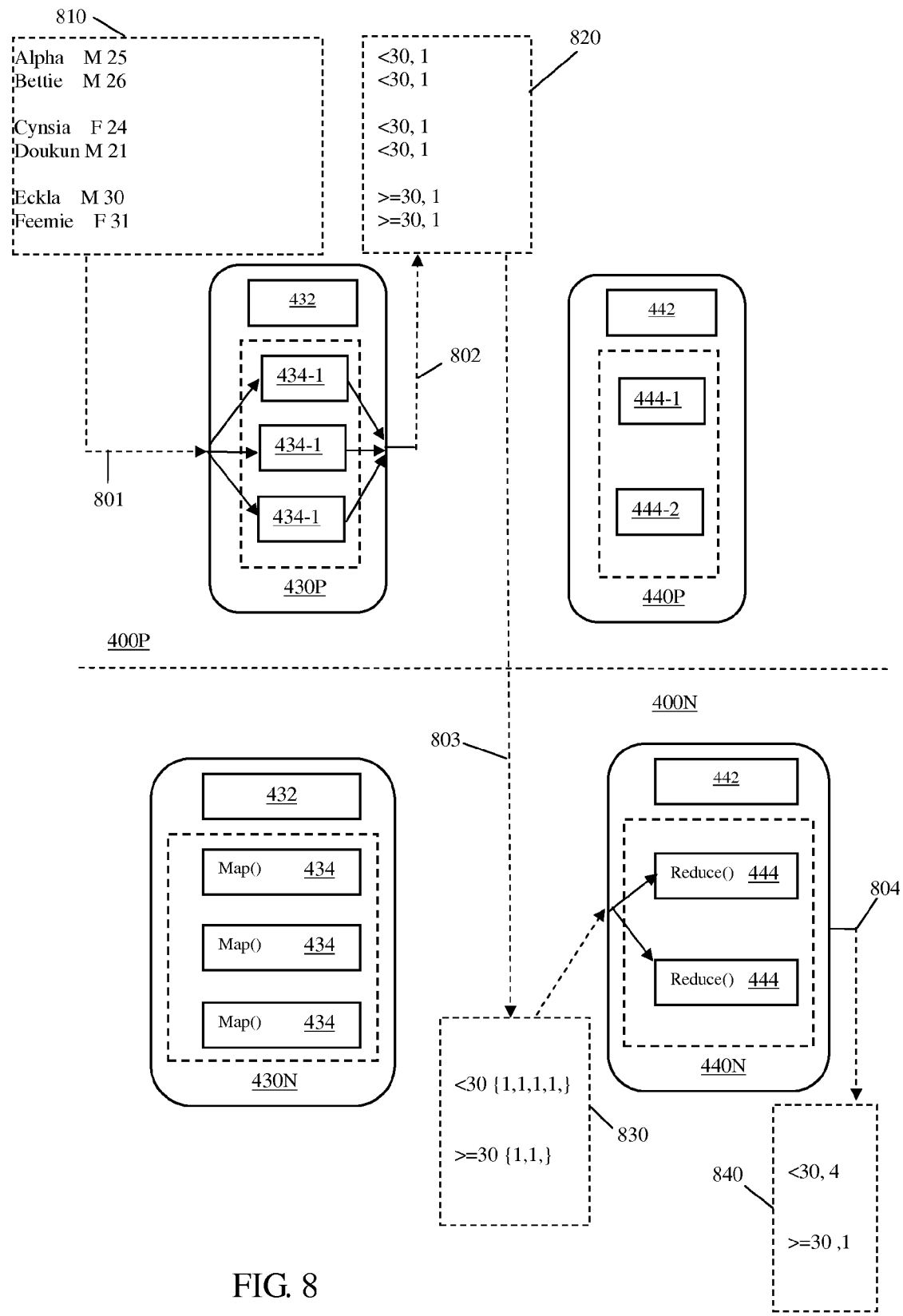

Referring to FIG. 8, description is given below on Example 3 which comprises both private data and non-private data.

EXAMPLE 3

The MapReduce Program 410 is Program 3, The Input Dataset 412 Is The Data Columns 1 To 3 Of Table 1.

Program 2: (function: calculate the number of people over 30 years of age (inclusive) and the under of people under 30 years of age)

```
MapInputSplit:
    For each input line
        EmitP (input line)
Map:
    For each input line;
        If (age> = 30)
            Then EmitP ("Over 30 ", "1");
        Else
            EmitP ("below 30", "1");
Reduce:
    For each {age span, list {"1"}};
    OutputN ("age span", SUM).
```

Based on the instructions EmitP(input line), EmitP("over 30","1"), EmitP("below 30", "1") and OutputN ("age span", SUM) in Program 3 that designate the privacy property of the input and output data of the Map function and the output data of the Reduce function, the privacy property of the input and output data of the Map function and the input and output data of the Reduce function is detected to be {Mi, Mo, Ri, Ro,}=(P, P, P, N).

The data is assigned accordingly as shown in FIG. 8.

As shown by dashed arrow 801, since Mi=P, the data fragment 810 of the source data is assigned to the Map tasks node 430P of the public subsystem 400P.

As shown by dashed arrow 802, the Map task node 430P generates the output data 820 of the Map function.

The Map function's output data 820 is converted into the input data 830 of the Reduce function. As shown by dashed arrow 803, since Ro=N, the input data 830 is assigned to the Reduce task node 440N of the private subsystem 400N. The input data 830 is used by Reduce task node 440N for the computation of the Reduce function.

As shown by dashed arrow 804, the Map task node 440N generates the output data 840 of the Reduce function.

The method for protecting privacy data in MapReduce systems in accordance with embodiments of the invention is described above by way of examples. In the above examples, Block 520 is carried out prior to the execution of the program 410. Therefore, the detection carried out in Block 520 belongs to static detection.

In many applications, the privacy property of the Map function's input/output data and the Reduce function's output data may be determined in advance. Therefore, programmers that provide a MapReduce program may use extended primitives of the Map function and the Reduce function, like MapSplitInutN( ), EmitP( ), and OutputN( ) etc., to indicate the privacy property of the input/output data of the Map function and the output data of the Reduce function.

With the inventive method, providers of cloud computing system services running MapReduce applications may detect out non-private data and private data that may be pre-defined by carrying out the static detection, and thereby process the detected non-private data only at a public subsystem, and allocate the detected private data to a private subsystem for processing.

In some MapReduce applications, there is a situation in which some output data of a Map function belong to private data, and others do not. Similarly, output data of certain Reduce function may not all have a uniform privacy property, namely, neither all are private data, nor non-private data. This is as shown in the following Example 4.

EXAMPLE 4

The MapReduce Program 410 is Program 2, The Source Data 412 Is The Data In Column 1-2 Of Table 1.

Program 4: (Calculate the number males and the number of females, the number of females being privacy data)

```
MapInputSplit:
    For each input line
        EmitP(input line)
Map:
    For each input line;
EmitP(gender, "1");
Reduce:
    For each {gender, List {"1"}};
        If (gender = "M")
            OutputP(gender, SUM);
        If (gender = "F")
OutputN(gender, SUM).
```

The only difference between Program 4 and Program 2 is that, in Program 4, there are two instructions of different type in the Reduce function that indicate the output data, OutputP (gender, SUM) and OutputN (gender, SUM), so that the privacy property of the actual output data of the Reduce function can not be uniquely determined. In other words, some output data of the Reduce function belong to private data, and some do not belong to private data. This situation is denoted as Ro=P+N.

In fact, if the instruction "OutputP(gender, SUM)" were revised to "OutputN(gender, SUM), then, by carrying out static detection and then data allocation accordingly, the Reduce function would be uniformly computed at the private subsystem 400N to ensure that the privacy data, i.e., the number of females, is not exposed to the public subsystem.

Hereinafter, with reference to FIG. 9 and taking Program 4 as example, a process of the method for dynamic detection and relevant data allocation in accordance with an embodiment of the invention is described.

Static detection is carried out first. In a manner similar to the static detection carried out with respect to Examples 1 to 3 in previous paragraphs, the static detection for Program 4 will result in {Mi, Mo, Ri, Ro,}=(P, P, P, P+N).

According to an embodiment of the invention, in block 520 of FIG. 5, if the privacy property of the output data of a Map function is not uniform, then the output data of the Map function may be randomly assigned to the public subsystem 400P or the private subsystem 400N; if the privacy property of the output data of a Reduce function is not uniform, then the output data of the Reduce function may be randomly assigned to the public subsystem 400P or the private subsystem 400N.

Under such a circumstance, the property of the actual output data of the Map function and the actual output data of the Reduce function may be determined through dynamic detection.

In other words, when carrying out static detection, the expression "Ro=P+N" may be understood as "Ro=P" or "Ro=N". Similarly, "Ri=P+N" may be understood as "Ri=P" or "Ri=N"; "Mi=P+N" as "MI=P" or "Mi=N" and "Mo=P+N" as "Mo=P" or "Mo=N".

In the present example, "Ro=P+N" is understood as "Ro=P". The data assignment shall be based on {Mi, Mo, Ri, Ro}=(P, P, P, P).

Figure 9:
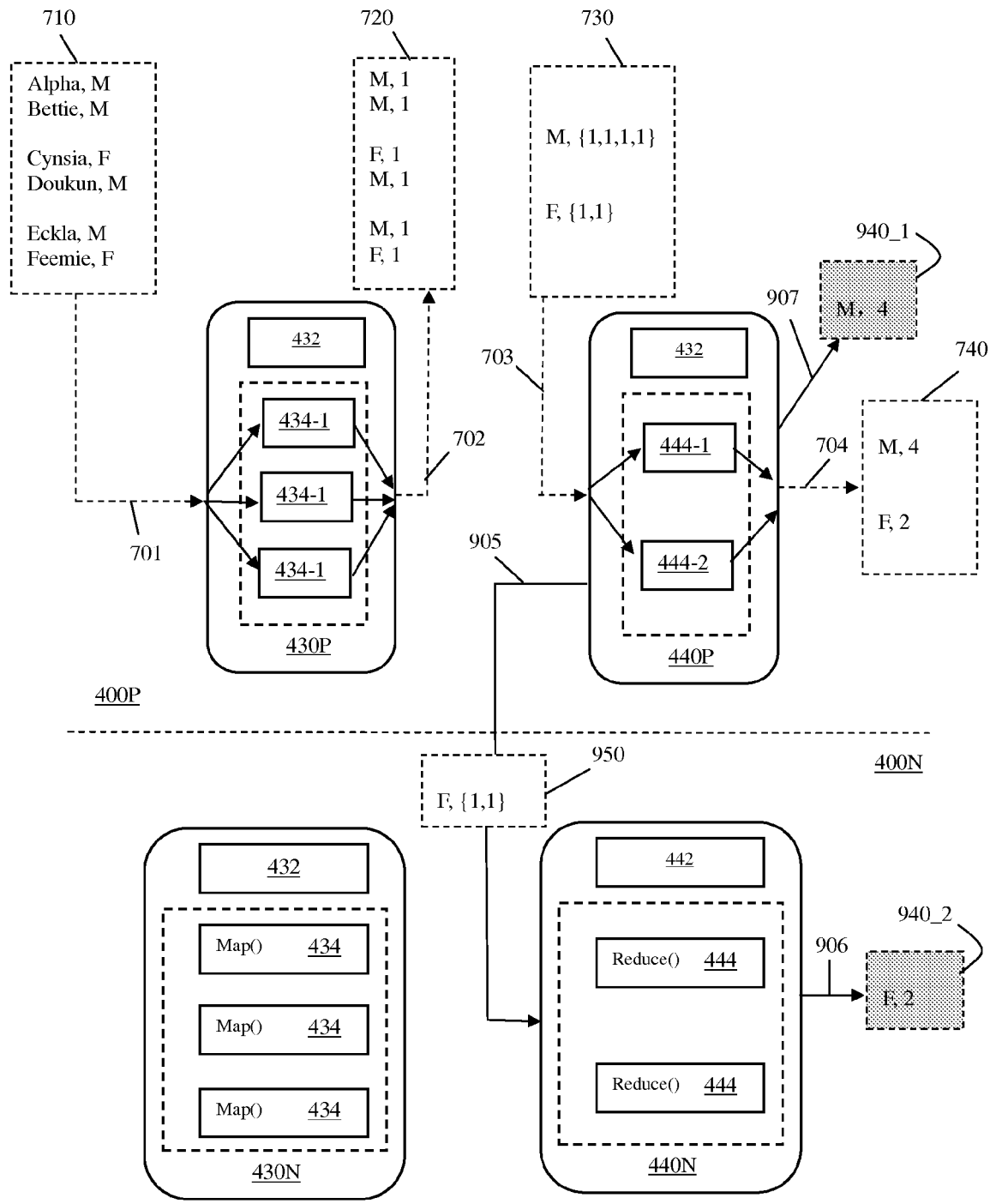
FIG. 9 schematically shows the process of the method for performing dynamic detection and data allocation according to various embodiments of the invention.

Thus, the process of static detection and data allocation shown in FIG. 9 is similar to that shown in FIG. 7, such as indicated by dashed arrows 701, 702, 703 and 704 as well as reference numbers 710, 720, 730 and 740. Hence, detailed description is omitted here.

It is to be noted that, in the process of static detection and data allocation, the output data 740 is allocated to 440P. However, in accordance with the requirement of the program:

```
If (gender =" F ")
    OutputN(gender, SUM)
```

"F, 2" in the output data 740 is the number of females which should be output to the private subsystem 400N. The problem can be solved through the dynamic process described below.

According an embodiment of the invention, detection on the data property of the actual output data of the Map function as well as the Reduce function may be made dynamically while the MapReduce program is running (Block 540), and the actual output data is assigned to the appropriate public subsystem 400P or private subsystem 400N, as appropriate, in accordance with the privacy property of the actual output data (Block 550).

The detection made in block 540 may be referred to as "dynamic detection" as opposed with to "static detection". Now assume that in block 540, it is detected that the instruction "OutputN(gender, SUM)" is executed while the program is running, i.e. the privacy property of the actual output data "F, 2" of the Reduce function is N, i.e., "private". Then, in block 550, the actual output data "F, 2" will be assigned to the private subsystem 400N according to its privacy property N.

Therefore, the task tracker 432 will output the output data "F, 2" shown in block 740 from the computing node 440P. Instead, as shown by the solid line arrow 905, it will re-direct the data "F{1,1}" (indicated by reference number 950), which is originally in the input data 730 of the Reduce function, to the Reduce computing node 440N of the private subsystem 400N. As shown by arrow 906, the Reduce computing node 440N will output, within the private subsystem 400N, the result of the Reduce computation, "F, 2" (indicated by reference number 940_2), i.e., the number of females ("F").

As shown by arrow 907, the Reduce computing node 440P of the public subsystem 400P will output the result of the Reduce computation, "M, 4" (940_1), having only the number of males ("M") but not the number of the number of females.

Based on the above example, it is not difficult for those skilled in the art to assign the actual output data to public subsystem or private subsystem as appropriate according to the privacy property of the output data detected by other dynamic detection operations.

Those skilled in the art shall appreciate that, where the definition for privacy data and non-privacy data is known in advance, various ways may be designed for the implementation of dynamic detection. For example, a detection program may be used to examine the running process of the MapReduce program, for example, examine whether the actual output data of the Map function and/or Reduce function satisfy the definition of privacy data and non-privacy data, thereby determining the privacy property of the actual output data.

According to an embodiment of the invention, one way to achieve the dynamic detection is to detect the privacy property of the actual output data of the Map function and the Reduce function according to a report in the MapReduce program runtime.

It is believed that the static detection of the invention is realized based on the extension of the MapReduce program. Thus it is conceived that the dynamic detection may also be realized by the extension of the MapReduce program.

For example, instructions Send2TT( )/Send2TT( ) in association with the data outputting instruction of the Map function and the Reduce function are inserted into Program 4, which are used notify the task tracker (TT) 432,442 of the privacy of the actual output data, as shown below.

```
Reduce:
    If (gender = "M")
        OutputP (gender, SUM);
        Send2TT(P);
    If (gender = "F")
        OutputN(gender, SUM);
        Send2TT(N).
```

"Send2TT (P)" means to report to the task tracker TT that currently the property of the actual output data is P, and "Send2TT (N)" means to the task tracker TT that currently the property of the actual output data is N. In this way, the task tracker will be able to dynamically detect the property of the actual output data.

Figure 10:
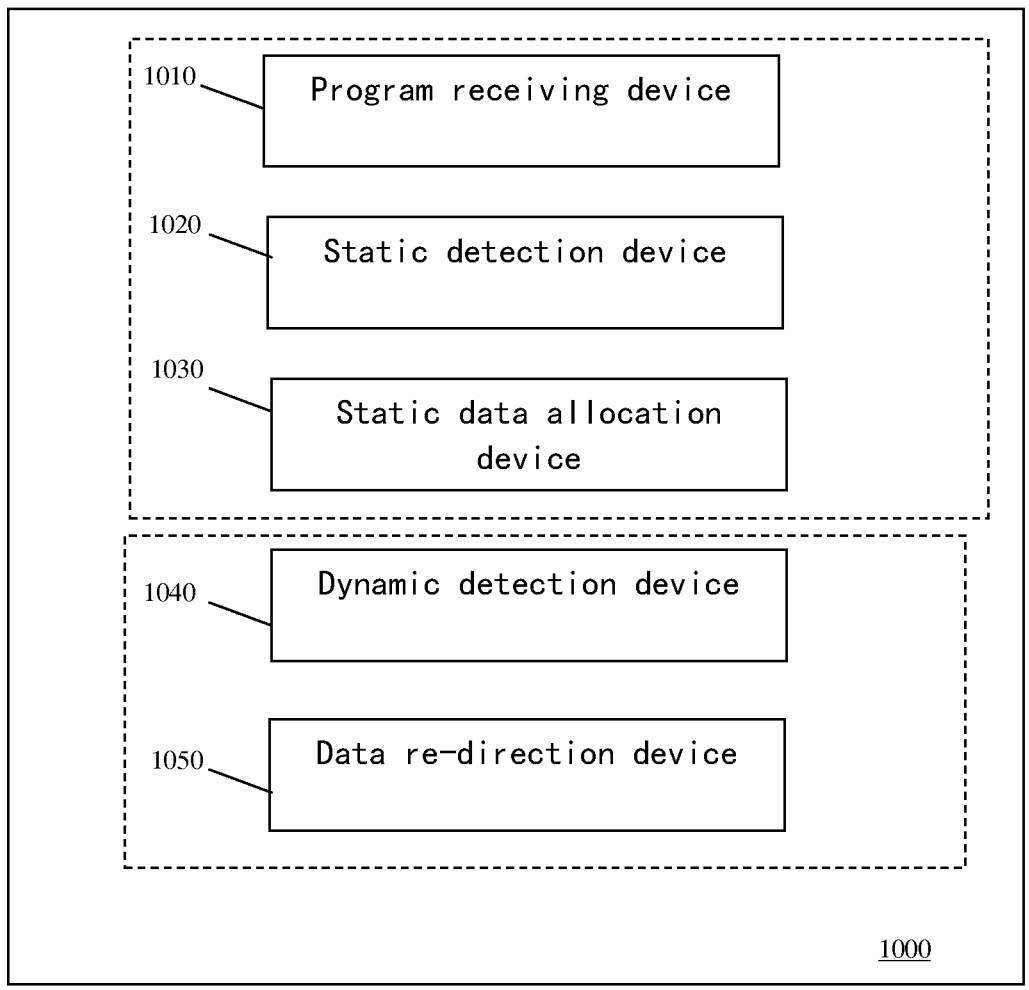
FIG. 10 schematically shows a block diagram of the apparatus according to an embodiment of the invention.

The method for protecting privacy data in the MapReduce system 400 of the invention is described above. According to the same inventive concept, the present invention also discloses an apparatus for protecting privacy data in a MapReduce system 400. FIG. 10 depicts a block diagram of the apparatus 1000 for protecting privacy data in a MapReduce system in accordance with an embodiment of the invention.

The apparatus 1000 as shown in FIG. 10 is for the protection of privacy data in the MapReduce system. The MapReduce system comprises a public subsystem 400P and a private subsystem 330N, and the apparatus 1000 comprises: a program receiving device 1010, a static detection device 1020, and a static data allocation device 1030.

The program receiving device 1010 is configured to receive a MapReduce program 410 to be executed in the MapReduce system, wherein the MapReduce program contains instructions that designate the privacy property of the input and output data of a Map function and the output data of a Reduce function.

The static detection apparatus 1020 is configured to MapReduce programs before detecting a Map function input, output data and the output data of the Reduce function privacy property.

The static data distribution apparatus 1030 is configured to detect the privacy property of the input and output data of the Map function and the output data of the Reduce function prior to execution of the MapReduce program.

According to an embodiment of the invention, the static data distribution apparatus 1030 is further configured to assign the data of which the privacy property is non-private to the public subsystem.

According to an embodiment of the invention, the static detection device 1020 is configured to detect the privacy property of the input and output data of the Map function and the output data of the Reduce function while the MapReduce program is being complied.

According to an embodiment of the invention, the static detection device 1020 is configured to detect privacy data from the input and output data of the Map function and the output data of the Reduce function by analyzing instructions in the MapReduce program that designate the privacy property of the input and output data of the Map function and the output data of the Reduce function.

According to an embodiment of the invention, the apparatus 1000 further comprises: a dynamic detection device 1040 and a data redirection device 1050.

The dynamic detection device 1040 is configured to dynamically detect the privacy property of the actual output data of the Map function and the Reduce function while the MapReduce program 410 is running.

The data redirection device 1050 is configured to assign the actual output data appropriately to the public subsystem of the private subsystem according to the privacy property of the actual output data.

According to an embodiment of the invention, the MapReduce program comprises extended instructions for reporting the privacy property of the actual output data of the Map function, and the dynamic detection device is further configured to Examining the privacy property of the actual output data of the Map function and the Reduce function according to a report in the MapReduce program runtime.

According to an embodiment of the invention, the static data device is further configured to: randomly assign the output data of the Map function to the public subsystem or the private subsystem, in response to the privacy property of the output data of the Map function being not uniform; and randomly assign the output data of the Reduce function to the public subsystem or the private subsystem, in response to the privacy property of the output data of the Reduce function being not uniform.

Various embodiments of the apparatus 1000 for protecting privacy data in a MapReduce system 400 have been described above. Since the method for protecting privacy data in a MapReduce system has been described in foregoing paragraphs, some of the content that is duplicate with the description of the method is omitted from the description of the apparatus 100.

Compared with the prior art, by employing embodiments of the invention in MapReduce applications, especially in cloud computing systems configured with the MapReduce architecture, improved security may be provided for data needing protection by users.

Embodiments of the invention have been described. The above description is only exemplary, rather than exhaustive or limited to the embodiments disclosed. Those skilled in the art shall appreciate that various modifications and alterations changes thereto may be readily made. The choice of terms herein is intended for best explaining the principle, practical application or improvement to the techniques in the market of the embodiments, or allowing those skilled in the art to understand various embodiments disclosed herein.

The invention claimed is:

1. A method for protecting privacy data in a MapReduce system comprising a private subsystem and a public subsystem, the method comprising:
    receiving a MapReduce program to be executed by a computer processor in the MapReduce system, wherein the MapReduce program contains instructions that designate a privacy property of input data and output data of a Map function and output data of a Reduce function;
    detecting the privacy property of the input and output data of the Map function and the output data of the Reduce function prior to execution of the MapReduce program;
    assigning the data for processing by the private subsystem and the public subsystem based on the detected privacy property, wherein the data of which the privacy property is private are assigned to the private subsystem;
    dynamically detecting the privacy property of actual output data of the Map function and the Reduce function while the MapReduce program is running; and
    assigning the actual output data appropriately to the public subsystem of the private subsystem according to the privacy property of the actual output data, wherein the MapReduce program comprises extended instructions for reporting the privacy property of the actual output data of the Map function and the privacy property of the actual output data of the Reduce function, and the dynamically detecting the privacy property of the actual output data of the Map function and the Reduce function while the MapReduce program is running further comprises examining the privacy property of the actual output data of the Map function and the Reduce function according to a report in the MapReduce program runtime.

2. The method of claim 1, wherein the assigning the data for processing by the private subsystem and the public subsystem based on the detected privacy property further comprises:
assigning the data of which the privacy property is non-private to the public subsystem.

3. The method of claim 1, wherein the detecting the privacy property of the input and output data of the Map function and the output data of the Reduce function prior to execution of the MapReduce program is made while the MapReduce program is being complied.

4. The method of claim 1, wherein the detecting the privacy property of the input and output data of the Map function and the output data of the Reduce function comprises:
detecting privacy data from the input and output data of the Map function and the output data of the Reduce function by analyzing instructions in the MapReduce program that designate the privacy property of the input and output data of the Map function and the output data of the Reduce function.

5. The method of claim 1, wherein the assigning the data for processing by the private subsystem and the public subsystem based on the detected privacy property comprises:
randomly assigning the output data of the Map function to the public subsystem or the private subsystem, in response to the privacy property of the output data of the Map function being not uniform;
randomly assigning the output data of the Reduce function to the public subsystem or the private subsystem, in response to the privacy property of the output data of the Reduce function being not uniform.

6. An apparatus for protecting privacy data in a MapReduce system comprising a private subsystem and a public subsystem, the apparatus comprising:
a program receiving device, configured to receive a MapReduce program to be executed by a computer processor in the MapReduce system, wherein the MapReduce program contains instructions that designate a privacy property of input data and output data of a Map function and output data of a Reduce function;
a static detection device, configured to detect the privacy property of the input and output data of the Map function and the output data of the Reduce function prior to execution of the MapReduce program;
a static data allocation device, configured to assign the data for processing by the private subsystem and the public subsystem based on the detected privacy property, wherein the data of which the privacy property is private are assigned to the private subsystem;
a dynamic detection device, configured to dynamically detect the privacy property of actual output data of the Map function and the Reduce function while the MapReduce program is running; and
a data redirection device, configured to assign the actual output data appropriately to the public subsystem of the private subsystem according to the privacy property of the actual output data;
wherein the MapReduce program comprises extended instructions for reporting the privacy property of the actual output data of the Map function, and the dynamic detection device is further configured to examine the privacy property of the actual output data of the Map function and the Reduce function according to a report in the MapReduce program runtime.

7. The apparatus of claim 6, wherein the static data allocation device is further configured to assign the data of which the privacy property is non-private to the public subsystem.

8. The apparatus of claim 6, wherein the static data allocation device is configured to detect the privacy property of the input and output data of the Map function and the output data of the Reduce function while the MapReduce program is being complied.

9. The apparatus of claim 6, wherein the static data allocation device is configured to detect privacy data from the input and output data of the Map function and the output data of the Reduce function by analyzing instructions in the MapReduce program that designate the privacy property of the input and output data of the Map function and the output data of the Reduce function.

10. The apparatus of claim 6, wherein the static data device is further configured to:
randomly assign the output data of the Map function to the public subsystem or the private subsystem, in response to the privacy property of the output data of the Map function being not uniform; and
randomly assign the output data of the Reduce function to the public subsystem or the private subsystem, in response to the privacy property of the output data of the Reduce function being not uniform.

11. A non-transitory, computer readable storage medium having computer readable instructions stored thereon that, when executed by a computer, implement a method for protecting privacy data in a MapReduce system comprising a private subsystem and a public subsystem, the method comprising:
receiving a MapReduce program to be executed in the MapReduce system, wherein the MapReduce program contains instructions that designate a privacy property of input data and output data of a Map function and output data of a Reduce function;
detecting the privacy property of the input and output data of the Map function and the output data of the Reduce function prior to execution of the MapReduce program;
assigning the data for processing by the private subsystem and the public subsystem based on the detected privacy property, wherein the data of which the privacy property is private are assigned to the private subsystem;
dynamically detecting the privacy property of actual output data of the Map function and the Reduce function while the MapReduce program is running; and
assigning the actual output data appropriately to the public subsystem of the private subsystem according to the privacy property of the actual output data, wherein the MapReduce program comprises extended instructions for reporting the privacy property of the actual output data of the Map function and the privacy property of the actual output data of the Reduce function, and the dynamically detecting the privacy property of the actual output data of the Map function and the Reduce function while the MapReduce program is running further comprises examining the privacy property of the actual output data of the Map function and the Reduce function according to a report in the MapReduce program runtime.

12. The computer readable storage medium of claim 11, wherein the assigning the data for processing by the private subsystem and the public subsystem based on the detected privacy property further comprises:
assigning the data of which the privacy property is non-private to the public subsystem.

13. The computer readable storage medium of claim 11, wherein the detecting the privacy property of the input and output data of the Map function and the output data of the Reduce function prior to execution of the MapReduce program is made while the MapReduce program is being complied.

14. The computer readable storage medium of claim 11, wherein the detecting the privacy property of the input and output data of the Map function and the output data of the Reduce function comprises:
   detecting privacy data from the input and output data of the Map function and the output data of the Reduce function by analyzing instructions in the MapReduce program that designate the privacy property of the input and output data of the Map function and the output data of the Reduce function.

\* \* \* \* \*